United States Patent [19]
Elder et al.

[11] 3,770,560
[45] Nov. 6, 1973

[54] COMPOSITE LAMINATE WITH A THIN, PERFORATED OUTER LAYER AND CAVITATED BONDED BACKING MEMBER

[75] Inventors: Gerald Brent Elder, Riverdale, N.Y.; Armand Francis Lewis, Erie, Pa.

[73] Assignee: American Cyanamid Company, Stamford, Conn.

[22] Filed: Oct. 21, 1971

[21] Appl. No.: 191,334

Related U.S. Application Data

[63] Continuation-in-part of Ser. No. 825,565, May 19, 1969, abandoned.

[52] U.S. Cl................. 161/112, 161/213, 161/214, 161/159, 161/160, 161/161, 181/33 G
[51] Int. Cl............................................. B32b 33/00
[58] Field of Search...................... 161/825, 565, 43, 161/68, 213, 214, 41, 109, 113, 160, 159, 161; 181/33

[56] References Cited
UNITED STATES PATENTS

| | | | |
|---|---|---|---|
| 2,870,857 | 1/1959 | Goldstein | 181/33 |
| 1,972,563 | 9/1934 | Irvin | 154/44 |
| 2,989,136 | 6/1961 | Wohlberg | 181/33 |
| 1,554,179 | 9/1925 | Trader | 161/109 |
| 2,990,027 | 6/1961 | Sabine | 181/33 |
| 3,261,882 | 7/1966 | Gorton | 260/830 |
| 3,095,943 | 7/1963 | Kemp | 181/33 |

Primary Examiner—George F. Lesmes
Assistant Examiner—Patricia C. Ives
Attorney—Frank M. Van Riet

[57] ABSTRACT

Laminates comprising a thin, perforated outer layer and a thicker cavitated backing member bonded thereto, are disclosed.

7 Claims, 6 Drawing Figures

PATENTED NOV 6 1973 3,770,560

INVENTORS.
GERALD BRENT ELDER
ARMAND FRANCIS LEWIS
BY
Frank M. Van Riet

ATTORNEY

INVENTORS.
GERALD BRENT ELDER
ARMAND FRANCIS LEWIS
BY
ATTORNEY

COMPOSITE LAMINATE WITH A THIN, PERFORATED OUTER LAYER AND CAVITATED BONDED BACKING MEMBER

CROSS-REFERENCE TO RELATED APPLICATIONS

This application is a continuation-in-part of our abandoned, Ser. No. 825,565, filed May 19, 1969 and entitled Integral Laminated Composite Structure.

BACKGROUND OF THE INVENTION

Acoustical laminates are known in the art and have been the subject of numerous patents. Most thin laminates are satisfactory for many commercial uses but fail in at least one of four important categories, which are essential for a structural acoustical control element, i.e., sound transmission loss, light weight, formability and structural integrity. That is to say, most commercial laminates do not sufficiently reduce sound transmission or absorb air-borne noise so as to allow their usage in, for example, chassis mounts and enclosures for electronic equipment, ultrasonic devices, engines, turbine housings, intake and exhaust systems, typewriter booths, transmission systems, acoustical dryers, sonochemical equipment and the like. Additionally, when they are made into such articles as sound-proof doors, and/or enclosures, etc. they are generally too heavy to be practical, especially for aircraft applications. Furthermore, many commercial metal laminates fail in practice because of their inability to be formed into various shapes without delaminating, i.e., the laminate fails when being drawn, bent, rolled, etc. into the configuration desired by the ultimate consumer. The postformability of acoustical laminates, therefore, is a great economic advantage when fabricating devices or assembling modules out of such acoustical materials.

SUMMARY

We have found that new and useful laminate structures can be prepared utilizing an outer layer of a perforated thin metal or plastic and a cavitated backing member of a thicker metal or plastic, the resultant structure possessing the desirable features mentioned above. For example, our laminates may be formed into many shapes such as bends and rolls. They may be fabricated, joined, and post-formed, etc. by conventional means known to those skilled in the art, e.g., plastic laminates may be heat formed or vacuum formed and metals welded.

Additionally, our novel laminates have unique sound transmission loss properties as compared to readily available commercial laminates. They also are lighter in regard to their overall surface area.

Our novel laminates are useful in such applications as architectural devices such as automotive parts, dishwasher panels, furnace housings, industrial articles such as screw machine stock tubes, ducts and exhaust hoods, industrial grinding equipment, building panels, electronic equipment panels and chassis, acoustical filters, instrument cabinets, sound suppression chambers, sonic welding unit housings and mufflers, sonic dispersing equipment housings, turbine and jet engine housings, exhaust and intake modules and mufflers, sonochemical device housings and the like.

BRIEF DESCRIPTION OF THE DRAWINGS

The drawings represent two aspects of our novel laminates wherein the backing member comprises either (1) a two-ply section made up of a perforated layer having a solid layer bonded thereto or (2) a single cavitated layer each being bonded to a perforated outer layer.

More particularly.

FIG. 3 is a cross-section of a laminate wherein the backing member of metal or plastic is represented by layer 1a, which layer has cavities 7a therein. The outer metal or plastic layer 2A contains perforations 6a and is bonded to layer 1a by means of adhesive layer 3a.

FIG. 4A is a second cut-away view of the FIG. 3 laminate wherein adhesive layer 3a is shown bonding the backing member of layer 1a containing cavities 7a to outer layer 2a containing perforations 6a.

DESCRIPTION OF THE INVENTION INCLUDING PREFERRED EMBODIMENTS

Figure 1:
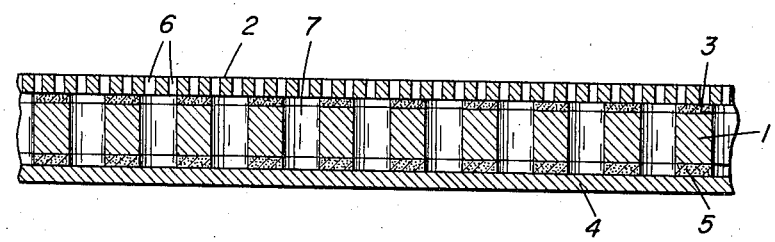
FIG. 1 is a cross-section of a laminate wherein the numeral 1 represents a metal or plastic layer having perforations 7 therein, which layer is bonded by means of adhesive layer 3, to outer metal or plastic layer 2 having perforations 6 therein. On the side of layer 1 opposite said layer 2, is bonded, by means of adhesive layer 5, solid layer 4, which also can be either plastic or metal. The section of the laminate comprising layers 1 and 4 bonded with 5 comprise the backing member.
Figure 2:
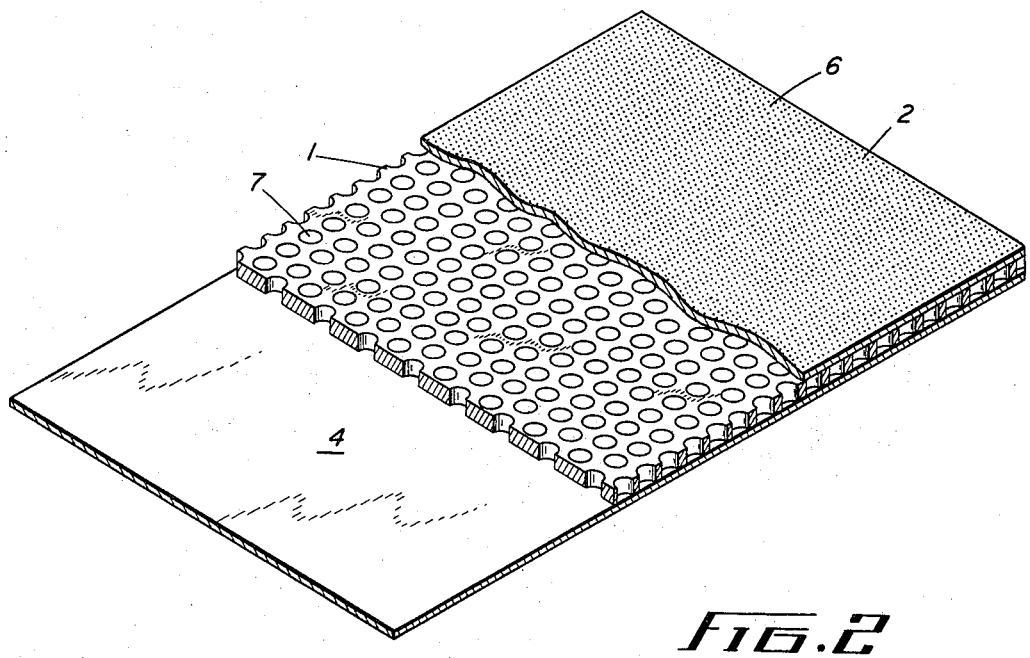
FIG. 2 is a cut-away view of a laminate similar to that of FIG. 1 except that the layers are of plastic and have been bonded together by heat sealing. As can be seen, the backing member comprises layer 1 having perforations 7 therein and solid layer 4. The outer layer 2 has perforations 6 therethrough.
Figure 2A:
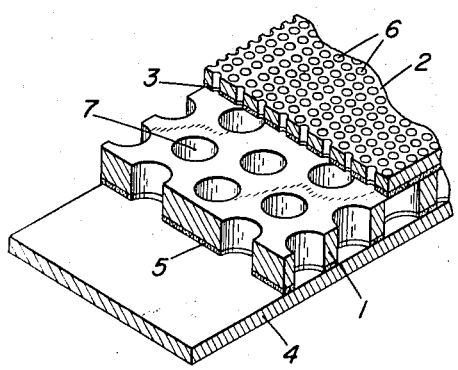
FIG. 2A is a cut-away view of a laminate of FIG. 1 wherein adhesive layers 3 and 5 are shown bonding layer 4 to one side of layer 1 and layer 2 to the opposite side of layer 1.
Figure 3:
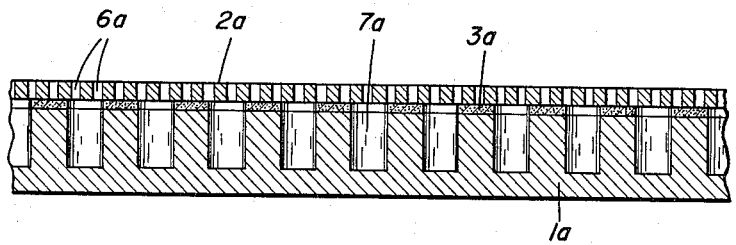
Figure 4:
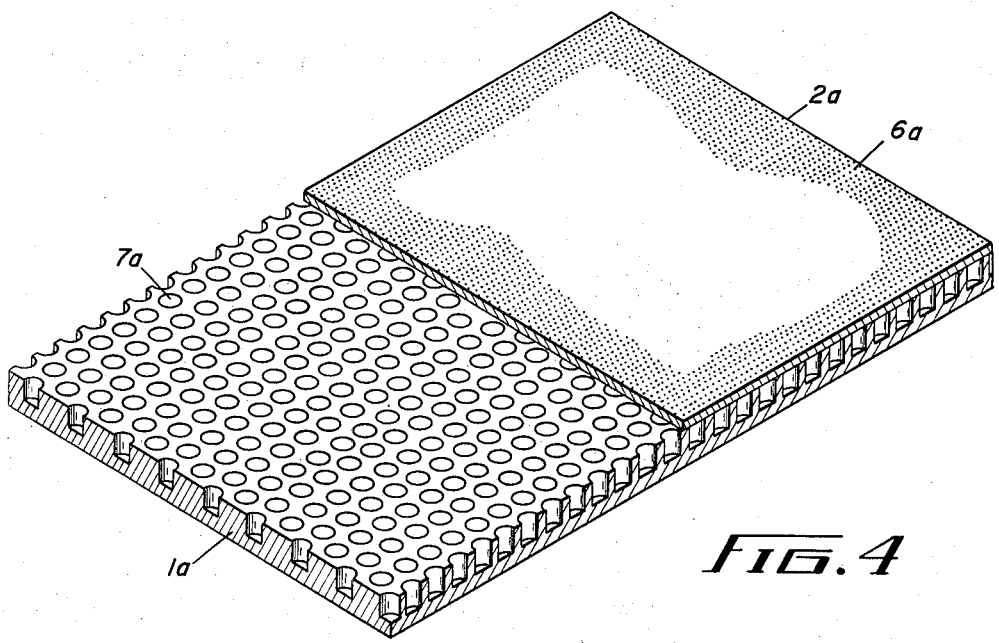
FIG. 4 represents a cut-away view of a laminate similar to that of FIG. 3 wherein backing member 1a is shown containing cavities 7a and having positioned thereon outer layer 2a containing perforations 6a. The layers are bonded together, as by heat or solvent sealing when plastics are used.
Figure 4A:
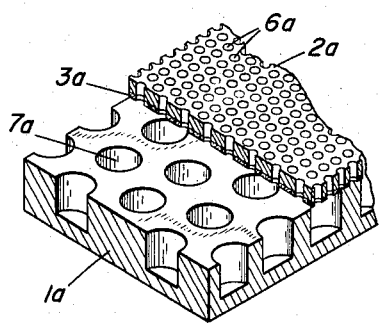

Our novel laminates, as mentioned briefly above, comprise two configurations: Type A, wherein a surface layer of metal or plastic, which is perforated through its surface area and through its cross-sectional area, and preferably, also possesses a desirable surface aesthetic appearance, corrosion resistance, mechanical strength and durability, is bonded to a backing member which is thicker in cross-section than said surface layer and is made up of (1) a plastic or metal layer also perforated through its surface area and cross-sectional area and (2) a layer of solid metal or plastic, the surface layer and the solid metal or plastic layer each being bonded to said perforated metal or plastic layer on opposite sides thereof, and Type B wherein a surface metal or plastic layer, as described above, is bonded to a backing member made up of a plastic or metal layer having cavities passing through at least 10 percent of and not more than 90 percent of its cross-sectional area.

A further feature of our novel laminate is that both the perforated outer layer and the cavitated backing member are structure bearing and are integral parts of the laminate i.e., each functions cooperatively with one another to form a structure bearing article which acoustically dampens sound. This achievement is obtained as a result of the fact that a majority of the perforations of the outer layer are positioned over the cavities of the backing member. That is to say, the perforations of the outer layer are positioned over pneumatically independent cavities in the backing member thereby forming holes which are acoustically active in the suppression of sound. These acoustically active holes run from the surface of the outer layer to the bottom of the cavities in the backing member and it is this feature, along with the other critical features discussed herein, which is unique in our novel laminates.

Since our laminates can be composed entirely of metal or plastic or mixtures thereof, some unique configurations result. For example, one can prepare a laminate with an opaque metal or plastic perforated outer layer, and a transparent backing member. Furthermore, if the backing member is a 2-component section, as described herein, and made up of transparent plastic, the resultant laminate can be utilized in a manner wherein a light source is placed behind a panel etc. of the laminate. The result is a system which both dampens sound and provides indirect lighting.

We achieve excellent results by the use of the combination of the perforated outer metal or plastic layer and the cavitated backing member bonded together with or without an adhesive, a few of the more preferred of which are the polyurethane based elastomeric adhesives disclosed and claimed in various copending applications mentioned more fully hereinbelow. Use of epoxy, epoxy-polyamide, epoxy-phenolic, polyimide type structural adhesives are also found to be effective in forming our novel laminates. The use of such perforated layers, backing members and adhesives results in excellent laminates, the adhesive portion of which, is generally less than one percent of the total weight of the laminate. As mentioned above, it is not necessary to utilize an adhesive to form our novel laminates. In this regard, if two plastic layers are used in a configuration wherein they abut one another, they may be bonded together without an adhesive such as by heat or solvent sealing and pressure consolidation. Such techniques are well known to those skilled in the art and therefore need not be discussed herein in great detail. It suffices to say that, for example, if two layers of polyvinyl chloride are in contact with each other as components of our novel laminates, they can be bonded by merely applying heat or solvent to at least one layer and bonding them together with or without externally applied pressure. They may also be bonded by sonic or friction welding.

Many types of metals may be utilized to produce our laminates with such metals as stainless steel, aluminum and carbon steel being exemplary. Zinc, gold, galvanized carbon steel, aluminum coated carbon steel, magnesium, copper, brass, refractory metals such as titanium, lead, nickel, silver, nickel alloys and the like may also be utilized as the top layer or backing members of our novel laminates without departing from the scope of the present invention. Double layers of each metal may also be used, e.g., aluminum on aluminum. Furthermore, if three metal layers are used, the layers may be of the same or a different metal.

Generally, any polymeric material may be utilized to form all or part of the backing member or outer perforated layer of our novel laminates, the specific polymer being selected according to the type of laminate being produced.

Examples of useful plastics include olefin polymers such as polyethylene, including high-density polyethylene, polypropylene; polyvinyl halides such as polyvinyl chloride; polyvinylidene halides such as polyvinylidene fluoride; polyethylene glycol terephthalate; "nylon" resins, i.e., adipic acid-polyalkyleneamine reaction products; polycarbonates, i.e., phosgene-polyhydroxyaryl reaction products; polyurethanes, i.e., polyether or polyester based isocyanate reaction products; polyvinyl acetate; polyvinylbutyral; butadiene copolymers; the polystyrenes, i.e., polystyrene per se, polymethylstyrene, cellulose polymers such as cellulose acetate; cellulose butyrate; acrylate and methacrylate homopolymers and copolymers such as poly(methyl methacrylate), poly(ethyl acrylate), methyl methacrylate-ethyl acrylate copolymers; the so-called "impact polymers" i.e., rubber-polymer blends such as blends of polystyrene with 5–10 percent of butadiene-styrene, polyacrylonitrile with 5–27 percent of butadiene-styrene, methyl methacrylate polymers with 20–50 percent of grafted polybutadiene; melamine-formaldehyde or phenolic type thermosetting resins; polysulfones, polymer blends etc.

As mentioned above, one of the unique features of our metal laminates, is the unusual sound transmission loss characteristics thereof in combination with thinness and light weight. Their ability to reduce the transmission of acoustical energy is even more astounding when it is realized that our laminates have sound insulation values better than the theoretical maximum for solid metal sheets of the same weight.

Our laminates also possess the ability to be stored at 82° C or higher (depending on the adhesive used in the metal laminate) for over 6 months without delaminating, a factor which thus increases their commercial attractiveness, in that retail and wholesale outlets may maintain a sufficient supply of the laminates on hand. Some laminates may also be used under cryogenic conditions because no delamination of fabricated structures of the laminate occurs at temperatures as low as −196° C.

Any known method may be used to form our novel laminates. For example, when solvent containing adhesives are used, the laminates of the instant invention may be prepared by coating one or both sides of the layers to be bonded together with an adhesive, evaporating off the solvent and placing the layers together under pressure to form the laminate. During the curing step, the solvent in the adhesive is evaporated off at 70°–120° C. and the adhesive is then cured at 110°–160° C. for 2 – 3 minutes. The layers are then pressed together at 50–100 psi and post-cured at 140°–150° C. for 8 – 16 hours. The adhesives may also be utilized as solvent free systems whereby no evaporation step is necessary before curing. Our laminates may be produced both by a continuous method whereby rolls of metal or plastic are continually coated with adhesive and feed to evaporation (optional), curing and nipping zones or in a bulk method whereby the layers are individually coated with adhesive, such as by spraying, and subjected to heat and pressure consolidation. The only critical limitation present in applying the adhesive material or heat or solvent sealing is that the adhesive or molten or dissolved plastic must not be allowed to clog or fill the cavities in the backing member or the perforations in the outer layer, in that, filling of the cavities or perforations with the adhesive materially affects the properties of the resultant laminate. Therefore, the adhesive must be carefully used when applied and it is hence, preferred to apply the adhesive thinly to the outer layer and thus minimize the tendency for the adhesive to flow into the perforations or cavities while being cured. A minimal amount of adhesive may, however, be tolerated in the cavities or perforations, and, of course, excess adhesive may be removed therefrom by merely scraping etc. the inside thereof or otherwise removing the adhesive after it is added. Alternatively, the adhesive may be advantageously placed a distance away from and around the perforations or cavities during the laminating step so that the pressure applied to the laminate does not cause the adhesive to flow thereinto. Another processing factor of importance is to press the laminate with the perforated surface layer of the laminate facing upward so that the adhesive, in its fluid state (before setting and cure), does not flow by the gravity force into the fine orifice holes of the layer to plug them.

The backing member must be cavitated and the outer thinner metal layer, as mentioned above, must be perforated in order to obtain the advantageous properties already set forth hereinabove. The perforations or cavities of either component may be circular, square, slot-shaped, oval, rectangular, diamond, star or random shaped holes, etc., no particular advantage or disadvantage being obtained herein by the use of any specific shape. The size of the perforation used is not critical provided that the outer layer has much smaller perforations than the cavities of the backing member. It is critical, however, that the backing member contain, on the average, at least three (3) cavities per square inch of surface area and that there are at least nine (9) perforations, of the outer layer, on the average, positioned over each cavity of the backing member. We have found that less than three cavities per square inch in the backing member and less than nine perforations per cavity in the outer metal layer severly hinder and detract from the sound deadening properties of our novel laminates. Another critical limitation, as mentioned above, resides in the fact that there must be at least about 50 acoustically active holes per square inch of surface area of the complete laminate. That is to say, there must be at least about 50 passages (per square inch of surface area) which pass from the surface of the outer perforated layer, through said layer, and into the backing member to the bottom of the cavities therein.

Additionally, if the laminate is to be used in architectural areas, it is preferred that the cavity diameter of the backing member be not greater than the thickness of the surface layer so that depressions of the surface metal into the cavities will not form when bending pressure is applied to the laminate during forming, thereby marring too severely the appearance of the surface layer.

By the terms perforations, cavities, etc., as used herein, is meant any indentation of the nature and type which can be produced by percussion, punching, punch-folding, drilling perforation or press molding techniques.

While the particular shape of the cavities in the backing member and the perforations in the outer layer is not critical, we have now found that the percent open area of the two components is critical and must range from about 10 percent to about 80 percent, preferably from about 40 percent to about 70 percent, in the backing member and from about 10 percent to about 40 percent in the outer perforated layer, in order to obtain optimum sound dampening results. When having these open areas, each of the outer layer and the backing member is, of necessity, non-reticulated, the use of reticulated members being undesirable.

As mentioned above, the perforation or cavity size is not critical, except that the perforations and cavities must range in size from about 1/100 inch to about ¾ inch at their shortest diameter i.e., that diameter of a circle inscribed and touching a majority of the interior points of the particular shape in question, and the ratio of the perforation or cavity diameter to the distance between the center of the perforation or cavity must range from at least 0.5 to less than about 1.0.

The backing member of our novel laminates may have a thickness ranging from about 5 to 1,000 mils, preferably from 10–500 mils while the outer layer may range in thickness from about 1–250 mils, the backing member always being thicker than the perforated outer layer.

A preferred laminate, preferred in that it possesses optimum characteristics in regard to those desirable properties mentioned above, comprises a perforated outer layer and cavitated backing member of aluminum or steel, about an 18-25 mils thick outer layer of from about 18 percent to about 28 percent open area and a perforation diameter of about 0.018 to 0.025 inch, and about a 70-90 mil thick backing member of about a 58-68 percent open area and a cavity diameter of about 0.160 inch to about 0.195 inch.

The adhesive layer, if used, should range in thickness from about 0.5 to 10 mils. Thicker layers are unnecessary and sometimes disadvantageous because of the difficulty in (1) fabricating thicker layer laminates without marring or indenting the surface and in (2) preventing the adhesive from filling the perforations of the outer layer and the cavities of the backing member but are not, however, to be excluded if necessary for some particular service application especially when a thermally and electrically insulating laminate is desired.

As mentioned above, generally any high strength adhesive material may be utilized as the bonding material in forming our novel laminates. Examples of suitable adhesives include the polyurethane resin based adhesives, silicone rubbers, polysulfides, epoxy resin-polysulfide mixtures, hydrocarbon rubbers such as butyl rubber-based systems, acrylic rubbers such as nitrile rubbers e.g., those produced from acrylonitrile, polyethylene or polypropylene (rubber modified) systems, epoxy-polyamide, epoxy-phenolic, nitrile-epoxy, polyimide, polybenzimidazole and the like. Especially useful adhesives are those which possess a dynamic glass transition temperature substantially at or below that temperature at which the laminate is ultimately to be used and a dynamic glass transition frequency at the application temperature at or above the frequency level to which the laminate will environmentally be subjected. This phenomenon is more fully described in an article by A.F. Lewis et al., Proc. Fourth Int. Congress on Rheol. Part 2, page 505, 1965, which article is hereby incorporated herein by reference. Further examples of useful adhesives include those disclosed and claimed in one or more of the following U.S. Pat. Nos.: 2,610,910; 2,400,612; 2,514,427; 2,581,920;

2,673,845; 2,684,351; 2,879,252; 2,918,442; 2,920,990 and 2,977,273, which patents are also hereby incorporated herein by reference. When bonding the laminate layers, two or more different adhesive systems may be used i.e., at each adhesive layer.

Additional adhesives which may be used to form the novel laminates of our invention are those specifically set forth and claimed in at least one of the following pending U.S. Pat. Nos.: 3,391,054; 3,309,261 and 3,290,208, which patents are also hereby incorporated herein by reference.

Briefly, these adhesives are composed of the following ingredients:

A. a polyurethane resin,
B. a diamine curing agent, and
C. a diglycidyl ester, a diglycidyl ether, a monoethylenically unsaturated monoglycidyl ether, or a monoethylenically unsaturated monoglycidyl ester, or
D. as a substitute for, or in addition to (C), an aminosilane, or
E. as a substitute for (D) and in addition to (C), an epoxy silane, or
F. in addition to components (A), (B), (C) and (E) a polyethylenically unsaturated compound.

Before applying the adhesive to the metal, the metal should preferably be chemically clean. This may be achieved by working the metal with hot aqueous alkali or acid solution. The adhesive is preferably used as a 40–50 percent solution in a solvent such as methyl ethyl ketone and may be applied to the metal by brushing, roller coating, curtain coating or spraying techniques and the like.

The following examples are set forth for purposes of illustration only and are not to be construed as limitations on the present invention except as set forth in the appended claims. All parts and percentages are by weight unless otherwise indicated.

EXAMPLE 1

A laminate is prepared by bonding together, in sequence, with a commercially available polyurethane based adhesive, (1) an outer perforated aluminum sheet, 0.020 inches thick, having 0.020 inch diameter perforations with staggered centers, 520 perforations per square inch of surface area and a 20 percent open area; (2) a perforated aluminum sheet, 0.080 inches thick, having 0.156 inch diameter cavities, staggered centers, 33 cavities per square inch of surface area and a 63 percent open area; and (3) a solid sheet of aluminum, 0.025 inches thick, said (2) and (3) forming the backing member.

A sound suppressor box, 16 inches × 7 inches × 8 inches, is then prepared from the resulting laminate, the outer layer of the laminate forming the inner surface of the box. A high frequency loud speaker is placed in the box and driven to produce a sound pressure level (SPL) of 104 decibels (dB) at about 12 kilihertz (Khz) as measured by means of an octave band sound analyzer, the microphone of which is one foot from the box, its axis being perpendicular to that of the speaker. When the door of the box is closed, the SPL falls to 65dB, a reduction of 39dB.

EXAMPLE 2

When a commercially available, glassy, brittle polyimide adhesive is substituted for the adhesive of Example 1, all other variables remaining equal, a similar SPL reduction is achieved using a sound suppressor box made from the resultant laminate.

Example 3

A "can," 5 inches in diameter and 8 inches deep, is prepared from the laminate of Example 1. The can is placed such as to enclose the tip of an ultrasonic welder. The noise level is recorded with the welder in operation while "staking" an automobile lamp assembly. With the octave center frequency for sound analyzer placed at the 16 Khz band, the SPL is measured at 91dB. With the "can" removed from the welder, in operation the SPL is 150dB.

Of significance in this result is the fact that the "can" of Example 3 has an areal density of 0.985 lbs./sq. ft. A lead lined laminate "can" having an areal density of 2.1 lbs./sq. ft. resulted in a SPL of 94dB. when used in the same manner. This result shows a dramatic deviation from the recognized mass-law.

Example 4

The laminate of Example 1 is formed into a box to house an ultrasonic disruptor. A 40dB. reduction in the SPL is achieved, transforming an impleasant and potentially hazardous 117dB. noisy operation into a safe quiet procedure i.e., 77dB.

A test was devised to quickly screen the sound transmission loss capabilities of various laminates of the instant invention.

A noise source was prepared by placing a high frequency loudspeaker in a stainless steel beaker, 8.5 inches deep and 7.25 inches wide. The speaker was driven by an audio oscillator. To minimize the transmission of sound through the walls of the beaker, it was placed in a barrel of sand such that the top of the beaker was level with the surface of the sand. This apparatus could produce a noise level of about 98 dB. at a microphone 18 inches above the beaker along its axis at the test frequency of about 10 Khz. The level of sound was measured by an octave band analyzer set to a 6–12 Khz pass band.

Samples were tested by observing the reduction in noise which resulted when they were placed over the mouth of the beaker. A ⅛ inch × 10 inches × 10 inches steel plate with a 7 ¼ inch diameter hole in its center was welded to the rim of the beaker to facilitate sample mounting. The plate was covered with ⅛ inch vinyl foam to seal the beaker when the sample was held against the plate by spring clips.

Results were recorded as the difference between the SPL observed with the sample in place and that observed with the top of the beaker open.

Utilizing this procedure, Table I lists noise reduction data on a series of laminates (10 inches × 10 inches panels) representing the instant invention with the perforated outer layer toward the sound source.

TABLE I

| Example | Description of laminate* | Areal density (lbs/sq ft) | Noise reduction (dB)[1] | OLH/ BMH | OLH/ sq in |
|---|---|---|---|---|---|
| 5 | 0.020" POL–Type #1; 0.080" PM–Type #63; 0.020" High impact transparent acrylic sheet. | 0.770 | 44 | 9.95 | 329 |
| 6 | 0.020" POL–Type #2; 0.080" PM–Type #63; 0.0125" solid aluminum. | .845 | 45 | 15.9 | 525 |
| 7 | 0.020" POL–Type #1; 0.125" PP–Type #58; 0.025" solid aluminum. | .966 | 51 | 25.4 | 305 |
| 8 | 0.010" POL–Type #5; 0.080" PM–Type #63; 0.025" solid aluminum. | 1.00 | 50 | 18.2 | 600 |
| 9 | 0.020" POL–Type #1; 0.080" PM–Type #63; 0.025" solid aluminum. | 1.09 | 52 | 9.95 | 329 |
| 10 | 0.020" POL–Type #4; 0.125" PP–Type #58; 0.025" solid aluminum. | .990 | 47 | 9.3 | 112 |
| 11 | Same as Example 9 except nitrile-epoxy adhesive used. | 1.04 | 46 | 9.95 | 329 |
| 12 | Same as Example 9 except polyimide adhesive used. | 1.04 | 44 | 9.95 | 329 |
| 13 | 0.020" POL–Type #4; 0.125" PP–Type #58; 0.125" high impact transparent acrylic sheet. | 1.30 | 53 | 9.3 | 112 |
| 14 | 0.020" POL–Type #1; 0.125" PP–Type #42; 0.025" solid aluminum. | 1.153 | 46.5 | 25.4 | 216 |
| 15 | 0.020" POL–Type #1; 0.125" PP–Type #23; 0.025" solid aluminum. | 1.310 | 49.5 | 25.4 | 127 |
| 16 | 0.020" POL–Type #4; 0.125" PP–Type #42; 0.025" solid aluminum. | 1.150 | 43.0 | 9.3 | 79 |
| 17 | Same as Example 9 except that solid aluminum replaced by 0.025" mill embossed (square pattern) sheet. | 1.11 | 49 | 9.95 | 329 |
| 18 | 0.020" POL–Type #1; 0.080" PM–Type #10; 0.025" solid aluminum. | 1.25 | 47 | 60 | 195 |

ABBREVIATIONS AND SPECIFICATIONS OF INFORMATION SET OUT IN TABLE I

* polyurethane based adhesive used unless otherwise specified.

1 - control - 98 dB.; 10.427 Hz incident frequency.

OLH/BMH - number of holes of outer layer (POL) open to individual holes in backing member (BM).

OLH/SQ. IN. - number of outer layer holes acoustically active per square inch of laminate surface.

POL - Type No. 1:
aluminum metal sheet with 0.020 inch diameter holes; staggered centers; 520 holes/in.$^2$; 20 percent open area.

POL - Type No. 2:
aluminum metal sheet with 0.020 inch diameter holes; 1/32 inch straight centers; 832 holes/in.$^2$; 26 percent open area.

POL - Type No. 4:
aluminum metal sheet with 0.040 inch diameter holes; staggered centers; 190 holes/in.$^2$; 23 percent open area.

POL - Type No. 5:
stainless steel metal sheet with 0.018 inch diameter holes; 1/32 inch straight centers; 950 holes/in.$^2$; 24 percent open area.

PM - Type No. 63:
aluminum metal sheet with 5/32 inch diameter cavities; 3/16 inch staggered centers; 33 cavities/in.$^2$; 63 percent open area; 0.01913 in.$^2$ area per cavity; single cavity volume - 0.00153 in.$^3$; cavity volume per square inch of surface area - 0.0504 in.$^3$.

PM - Type No. 10:
aluminum metal sheet with slot cavities ⅛ inch × 1 inch; side staggered; side bar ⅛ inch; end bar ⅛ inch; 43 percent open area; 3.5 slots/in.$^3$.

PP - Type No. 58:
high impact modified acrylic polymer with ¼inch diameter cavities; 5/16 inch staggered centers; 12 cavities/in.$^2$; 58 percent open area; 0.049 in.$^2$ area per cavity; single cavity volume - 0.00613 in.$^3$; cavity volume per square inch of surface area - 0.072 in.$^3$.

PP - Type No. 42:
high impact modified acrylic polymer with ¼ inch diameter cavities; ⅜ inch staggered centers; 8.5 cavities /in.$^2$; 42 percent open area; 0.049 in.$^2$ area per cavity; single cavity volume - 0.00613 in.$^3$; cavity volume per square inch of surface area - 0.0522 in.$^3$.

PP - Type No. 23:
high impact modified acrylic polymer with ¼ inch diameter cavities; ½ inch staggered centers; 5 cavities/in$^2$; 23 percent open area; 0.049 in.$^2$ open area per cavity; single cavity volume - 0.00613 in.$^3$; cavity volume per square inch of surface area - 0.0307 in.$^3$.

To illustrate the effectiveness of other laminates of the instant invention wherein the backing member comprises one layer of material bonded to the perforated outer layer, various configurations were produced and tested in a manner similar to the Examples set forth hereinabove.

The results are set forth in Table II, below. In each instance, the adhesive utilized was a commercially available neoprene-phenolic contact cement. The perforated outer layer was the same as that designated as POL - Type No. 1, above. The backing member was produced from polyvinyl chloride sheet, ¼ in. thick. All cavities were ¼ inch in diameter (area - 0.0491 in.$^2$); staggered with open areas as set forth for PP - Type No. 58; PP - Type No. 42 and PP - Type No. 23, set forth above.

TABLE II

| Example | Depth of cavity (in) | PP— type (No.) | Areal density (lbs/sq ft) | Noise reduction** (dB)[1] | OLH/ BMH | OLH/ sq in |
|---|---|---|---|---|---|---|
| 19 | 3/16 | 23 | 1.815 | 50.5 | 25.4 | 127 |
| 20 | 3/16 | 42 | 1.660 | 59.0 | 25.4 | 216 |
| 21 | 3/16 | 58 | 1.467 | 52.0 | 25.4 | 305 |
| 22 | 1/16 | 23 | 1.936 | 56.0 | 25.4 | 127 |
| 23 | 1/16 | 42 | 1.876 | 50.0 | 25.4 | 216 |
| 24 | 1/16 | 58 | 1.860 | 49.5 | 25.4 | 305 |

Abbreviations and specifications: **—9060 hertz incident frequency. See Table I for all others Example 25

A sheet of 0.020 inch thick commercially available ABS type impact plastic identical in geometrical perforation configuration to that identified above as POL Type No. 4 is heat bonded to a 0.125 inch thick sheet identical in configuration to PP Type No. 42 except that it is composed of the same ABS type plastic. A third sheet of the same ABS plastic, 0.020 inch thick, is then heat sealed to the side of said Type No. 42 sheet opposite said 0.020 inch outer layer.

When tested in a manner similar to the laminate of Example 5, the noise reduction is 45 dB.

We claim:

1. A laminate consisting essentially of a perforated outer metal or plastic layer having a thickness of from about 1 to about 250 mils and a non-reticulated cavitated imperforate backing member having a thickness of from about 5 to about 1,000 mils and at least, on the average, three cavities per square inch of surface area, the outer layer being bonded onto the cavitated side of said backing member the open area of said outer layer and said backing member ranging from about 15 percent to about 80 percent, the perforations in said outer layer and the cavities in said backing member being substantially void of adhesive and other extraneous material, the perforations in said outer layer being smaller than those of said backing member and said backing member being thicker than said outer layer, at least nine, on the average, of the perforations of said outer layer being positioned over each cavity of said backing member, and at least about 50 acoustically active holes per square inch of laminate.

2. A laminate according to claim 1, wherein said backing member comprises a sheet of metal or plastic having cavities at least 10 percent and not more than about 90 percent through the cross-section thereof.

3. A laminate according to claim 1, wherein said backing member comprises a perforated metal or plastic layer having bonded thereto, on the side opposite said outer layer, a layer of metal or plastic.

4. A laminate according to claim 1, wherein said outer layer and said backing member are aluminum or steel.

5. A laminate according to claim 1, wherein the adhesive is an epoxy resin, a polyurethane resin or polyimide resin based.

6. A laminate according to claim 1 wherein said outer layer is about 18–25 mils thick, has an open area of from about 18 percent to about 28 percent and a perforation diameter of from about 0.018 inch to about 0.025 inch and said backing member is about 70–90 mils thick, has an open area of from about 58 percent to about 68% and a cavity diameter of from about 0.016 inch to about 0.195 inch.

7. A laminate according to claim 1 wherein at least one of said outer layer and said backing member is a transparent plastic.

* * * * *